No. 863,711. PATENTED AUG. 20, 1907.
C. GERAEDTS, A. BLOCKS, Jr. & W. BYVOET AZ.
DEVICE FOR MOLDING VESSELS, SUCH AS FLOWER POTS AND THE LIKE.
APPLICATION FILED JUNE 18, 1906.
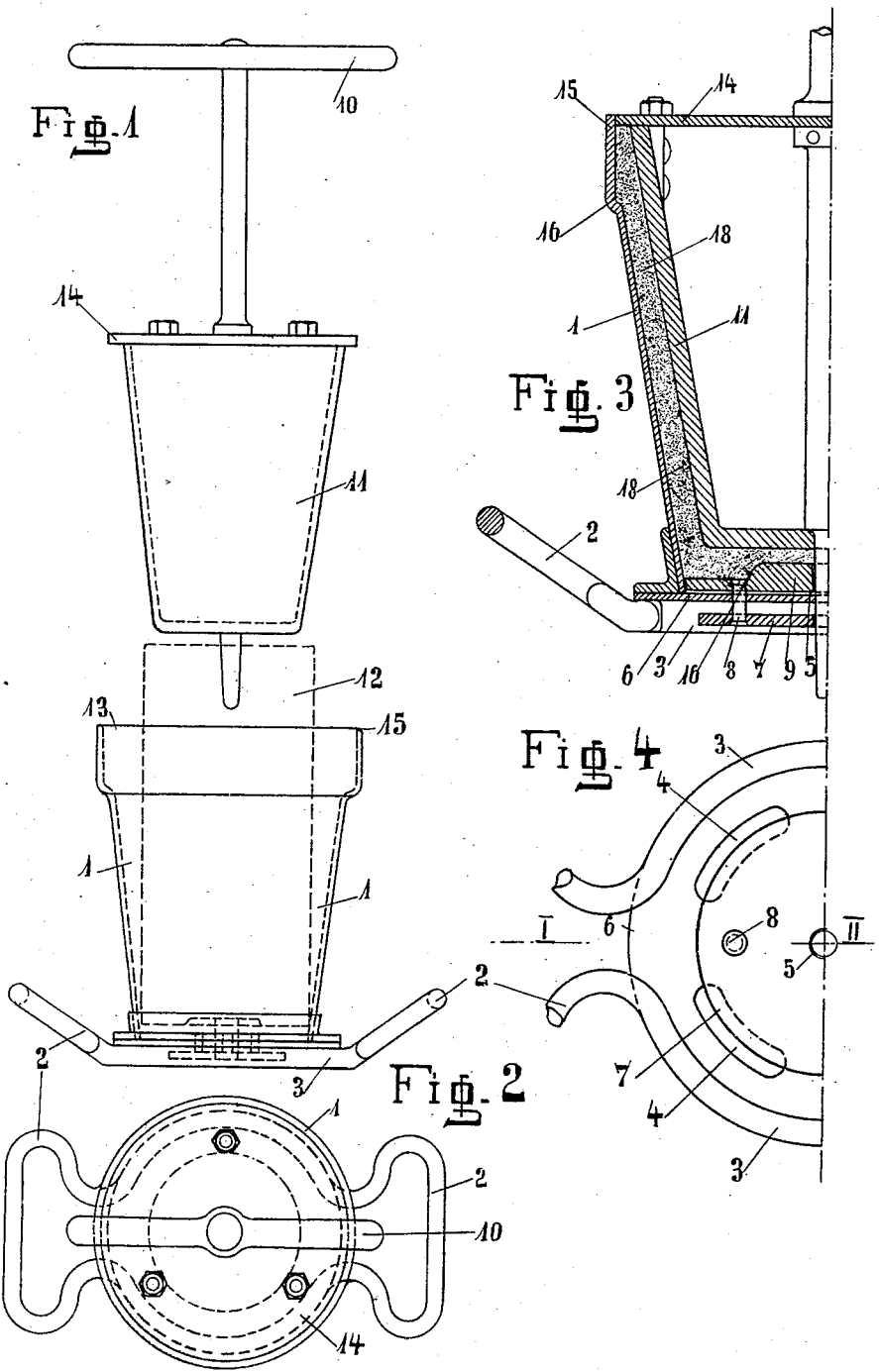

UNITED STATES PATENT OFFICE.

CONRARDUS GERAEDTS, ADRIANUS BLOCKS, JR., AND WILHELMUS BYVOET AZ, OF ROERMOND, NETHERLANDS.

DEVICE FOR MOLDING VESSELS, SUCH AS FLOWER-POTS AND THE LIKE.

No. 863,711.     Specification of Letters Patent.     Patented Aug. 20, 1907.

Application filed June 18, 1906. Serial No. 322,267.

*To all whom it may concern:*

Be it known that we, CONRARDUS GERAEDTS, mechanic, ADRIANUS BLOCKS, Jr., merchant, and WILHELMUS BYVOET Az, merchant, all subjects of the Queen of the Netherlands, and residents of Roermond, Netherlands, have invented new and useful Improvements in a Device for Molding Vessels, such as Flower-Pots and the Like, of which the following is a specification.

This invention relates to a device for molding vessels, for instance flower-pots and the like in a simple manner by hand. The objects are to be made of cement instead of clay which was usually employed for this purpose.

In the accompanying drawing which is a constructional form of the invention by way of example Figure 1 is a front view of the molding box of the device with the form lifted out. Fig. 2 is a plan of the device. Fig. 3 is a section on line I—II of Fig. 4 through the molding box with inserted form. Fig. 4 is a view of Fig. 3 from below.

The molding box 1 rests on the feet 3 shaped to handles 2. Resting on the foot 3 is a base plate 6 which closes the molding box 1 and is furnished with the slots 4 and the hole 5 in its center, a heavy detachable plate 9 resting on said base plate 6. The disk 7 placed underneath the base plate 6, but leaving a space between the same, is bolted to the heavy plate 9 by a bolt 8 which projects through a bore in said base plate 6. A form 11 furnished with the handle 10 and a hollow tin cylinder 12 forms part of the molding device. The mode of operation of the device is as follows: After having filled the space 13 between the hollow cylinder 12 and the molding-box 1 with cement, the cylinder 12 is lifted out and the form 11 is inserted in its place and twisted downwards until the plate 14 is level with the upper rim 15 of the molding-box 1. During this operation a part of the superfluous cement in the molding-box 1 will escape through the apertures 4 in the base plate 6 and a part will be forced out of the top of the molding-box. After removing the form 11 the pot 18 is removed from the molding-box 1 by tipping the latter over on a suitable base, and then lifting said box 1.

While tipping over the molding-box 1, the plate 9 presses down with its weight on the base of the pot 18 and thus facilitates the removal of the latter. The pots produced by these means take the shape of the molding-box 1 and may represent flower-pots and the like, furnished with a rim 16 as shown in the drawing or without said rim.

Having fully described our invention, what we claim and desire to secure by Letters Patent is:—

A device for molding vessels, such as flower-pots and the like, out of cement by hand, comprising in combination, the molding-box (1) and the foot (3) shaped to form handles on which said molding-box stands, and a base plate (6) with apertures which is adapted to close said molding-box carrying a movable heavy plate (9) bolted to a disk (7) and adapted to press out the molded pot after tipping over said molding-box, substantially as described and shown and for the purpose set forth.

In testimony whereof we have hereunto set our hands in the presence of two subscribing witnesses.

CONRARDUS GERAEDTS.
                     ADRIANUS BLOCKS, JUNIOR.
                     WILHELMUS BYVOET AZ.

Witnesses:
   AIRE H. VOORURUDSU,
   JOHANNES D. FRIBOURG.